Feb. 22, 1955

C. J. HAKES 2,702,786

IRON PRECIPITATOR

Filed Feb. 27, 1952

INVENTOR.
Carlton J. Hakes
BY Arthur H. Sturges
Attorney

Feb. 22, 1955  C. J. HAKES  2,702,786
IRON PRECIPITATOR
Filed Feb. 27, 1952  2 Sheets-Sheet 2

INVENTOR.
Carlton J. Hakes
BY Arthur H. Sturges
Attorney

United States Patent Office 2,702,786
Patented Feb. 22, 1955

2,702,786

IRON PRECIPITATOR

Carlton J. Hakes, Spencer, Iowa

Application February 27, 1952, Serial No. 273,657

3 Claims. (Cl. 210—26)

This invention relates to water purifying systems or means for removing precipitate, residue, or sediment from water purifying systems, and in particular a storage or settling tank to the lower part of which water is delivered and from the upper part of which water from which precipitate and particularly dissolved iron, has been removed is drawn.

The purpose of this invention is to provide a water purifying device in which dissolved iron and other precipitate are continuously removed from water by gravity in repeated cycles of operation and in which accumulated sludge is removed from the device with each cycle of operation.

Various types of water filtration plants using chemicals, agitators and other means for removing dissolved iron and other precipitate have been employed, however, for certain uses and particularly for removing dissolved iron it has been found desirable to provide a chamber or tank from which the precipitate is removed with each cycle of operation.

With this thought in mind this invention contemplates means for removing dissolved iron from a water system which includes a storage or supply tank in which the water is retained prior to use and means for continuously removing precipitate or sludge from the tank.

The object of this invention is, therefore, to provide means for removing iron from a water system whereby the iron is oxidized by the application of air to water in a storage and supply tank and surplus air which bubbles from the water is released from the water before the water passes into the tank.

Another object of the invention is to provide means for removing iron from a water system in which the iron precipitate, which accumulates in the bottom of a tank in which the water is temporarily stored, is flushed from the tank by the pressure of water therein when the precipitate reaches a predetermined level.

Another important object of the invention is to provide a water purifying system in which a tube for withdrawing water from a settling or supply tank is supported by a float on the water whereby the suction end of the tube is positioned just below the surface of the water.

A further object of the invention is to provide a device for removing dissolved iron from water purifying systems which is of a simple and economical construction.

With these and other objects and advantages in view the invention embodies a substantially closed tank with parallel manifolds having spaced tubular fingers extended laterally therefrom in the lower part thereof, inverted U-shaped connections with vents in their upper ends connecting the manifolds to inlet or supply pipes, and an outlet or suction pipe extended through the wall of the tank and having an intake tube with an inverted upper end pivotally mounted on the end thereof extended into the tank.

Other features and advantages of the invention will appear from the following description taken in connection with the drawings, wherein.

Figure 1:
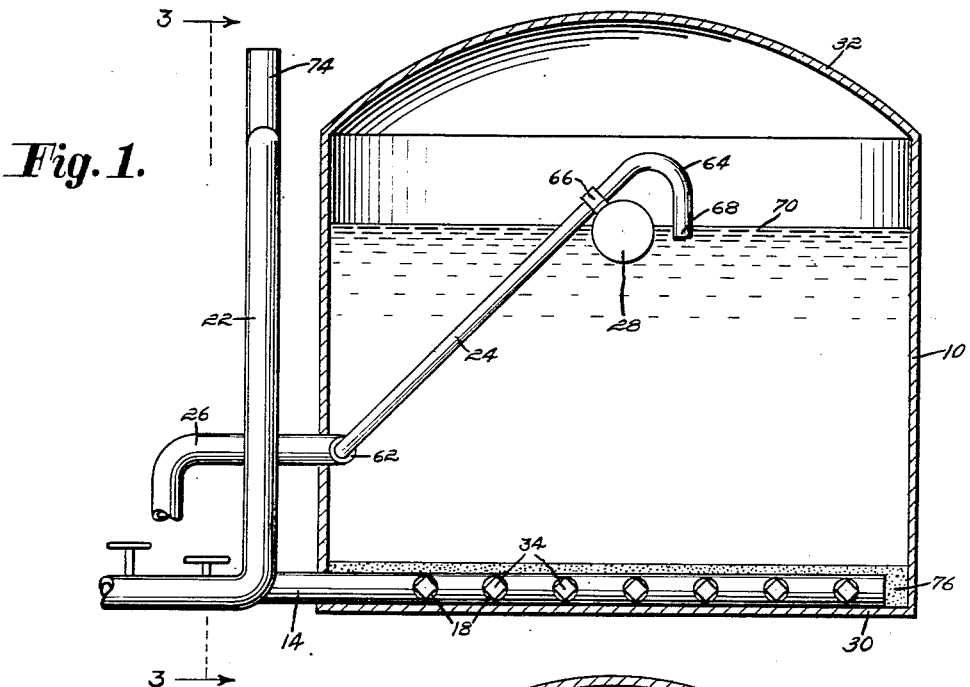
Figure 1 is a vertical section through the tank with the inlet and outlet pipes shown in elevation and with the tubular fingers of the manifold on the near side of the tank shown in section.
Figure 2:
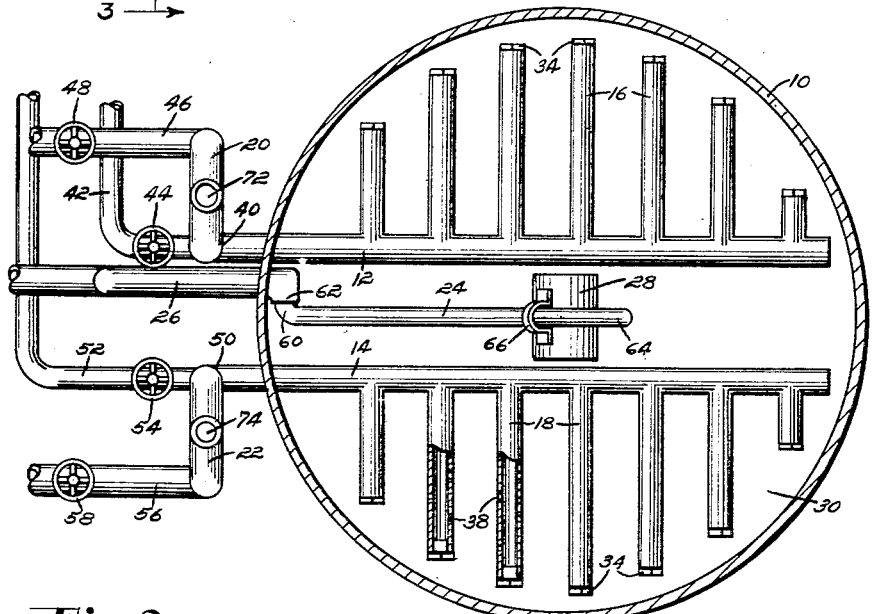
Figure 2 is a sectional plan through the upper part of the tank with the tubes and pipes shown in elevation and with the fingers of one of the manifolds broken away and shown in section.
Figure 3:
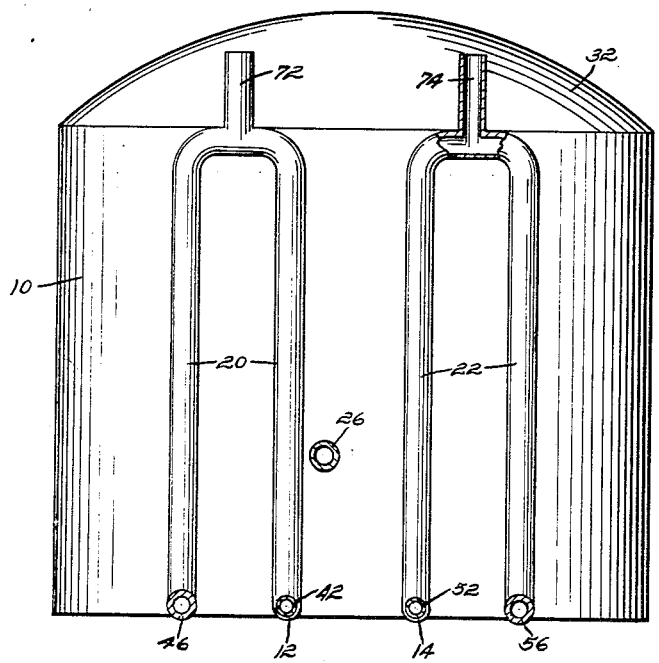
Figure 3 is a side elevational view of the tank taken on line 3—3 of Figure 1 with the inlet and outlet pipes shown in section and with the upper part of one of the U-shaped connections broken away and shown in section to illustrate the vent thereon.
Figure 4:
Figure 4 is a cross section through the manifolds with the tank omitted, showing the perforations in the tubular fingers.

Referring now to the drawings wherein like reference characters denote corresponding parts, the iron precipitator for water purifying systems of this invention includes a tank 10, headers or manifolds 12 and 14 having spaced tubular fingers 16 and 18, respectively, extended therefrom, U-shaped connections or units 20 and 22, each having spaced vertically disposed inner and outer legs connected at their upper ends with an arcuate section, an intake tube 24 pivotally mounted on a suction pipe 26, and a float 28.

In the design shown the tank is formed with a cylindrical wall having a base or bottom 30 and a dome-shaped upper end 32. The manifolds 12 and 14 with the fingers 16 and 18 are positioned in the lower part of the tank and the ends of the fingers are closed with caps or plugs 34. The sides of the fingers 16 are provided with perforations 36 and similar perforations 38 are provided in the sides of the fingers 18, whereby water supplied to the manifolds and fingers is sprayed into the lower end of the tank.

Figure 5:
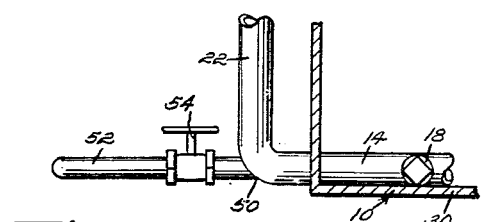
Figure 5 is a detail showing the connections of the blow-off pipes to the manifolds.

The outer end of the manifold 12 is connected to the U-shaped element 20 at the point 40 from which a blow-off pipe 42 having a valve 44 therein, extends, and the opposite section of the element 20 is connected to a supply pipe 46 in which is a valve 48. In the same manner the outer end of the manifold 14 is connected to the U-shaped element 22 at the point 50 and a blow-off pipe 52 having a valve 54 therein extends from this point as shown in Figure 5. The opposite section of the element 22 is connected to a supply pipe 56 which is provided with a valve 58.

The intake tube 24 is formed with an L-shaped lower end 60 by which the tube is held in a swivel joint 62 on the end of the suction pipe 26 and the upper end of the tube 24 is formed with an inverted U bend 64. The float 28 is secured to the tube with a bracket 66 and the float is positioned whereby the tip 68 of the tube extends into water, as indicated by the numeral 70, in the tank, the tip 68 being slightly below the surface of the water at all times.

In operation, the valves 44 and 54 in the blow-off pipes are closed and the valves 48 and 58 in the supply pipes 46 and 56 are opened whereby water containing air and chlorine is delivered under pressure to the connections 20 and 22. Excess air in the water, such as air that is not absorbed or taken up by the water is released through the vents 72 and 74 at the upper ends of the connections 20 and 22, respectively. The water in the U-shaped connections 20 and 22 descends by gravity and passes into the manifolds 12 and 14 from which it escapes through the perforations of the fingers 16 and 18 into the lower part of the tank.

As the water level rises slowly in the tank the iron content thereof becomes oxidized due to the air in the saturated water and this iron oxide settles downwardly to the bottom of the tank forming precipitate or sludge, as indicated by the numeral 76. Suction applied to the pipe 26 draws water through the tube 24 from a point slightly below the surface of the water whereby water is withdrawn for use.

It is preferred to use a tank of sufficient size to provide at least a forty-eight hour supply of water whereby sufficient time is provided for the sludge to settle. When a predetermined amount of sludge has accumulated in the bottom of the tank either or both of the valves 48 and 58 are closed and one or both of the valves 44 or 54 in the blow-off lines are opened, whereby the head of water in the tank 10 drives the sludge through the perforations in the fingers of the manifolds and through the manifolds to the blow-off pipes. The sludge is taken from the blow-off pipes to a suitable point of disposal.

As soon as the sludge is sufficiently drained from the tank the valves 44 and 54 are closed and the valves 48 and 58 opened whereby water is again supplied to the device and the cycle of operation is repeated.

From the foregoing description it is thought to be obvious that an iron precipitator for water purifying systems constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A precipitate remover for water purifying systems comprising a tank, a manifold having laterally positioned perforated fingers extended therefrom positioned in the bottom of the tank, an inverted U-shaped element having spaced vertically positioned legs connected at their upper ends with an arcuate section, said element having a vent in the arcuate section at the upper end, said U-shaped element being positioned with the lower end of one leg connected to the manifold and with the lower end of the other leg connected to a source of water supply, a blow-off connection extended from the end of the manifold connected to the U-shaped element, a water supply connection extended through the wall of the tank, a water intake tube extended from said water supply connection, and means retaining an extended end of the intake tube slightly below the surface of the water continuously.

2. In a precipitate remover for water purifying systems, the combination which comprises a substantially closed tank, a water supply header having perforated tubular fingers extended laterally therefrom positioned in the bottom of the tank, an inverted U-shaped unit having spaced vertically disposed legs positioned outside of the tank, the upper ends of said legs being connected with an arcuate section, said arcuate section connecting the upper ends of the legs having a vent therein and said vent being formed with a tube extended upwardly from the arcuate section, the lower end of one of the legs of the unit being connected to the water supply header and the lower end of the other leg being connected to a source of water supply, a blow-off connection extended from said header, a draw-off pipe extended through the wall of the tank, an intake tube having an inverted U-shaped upper end connected with a swivel joint to said draw-off pipe, and a float carried by the intake tube and positioned to retain the upper end of the tube below the surface of water in the tank.

3. In a precipitate remover for water purifying systems, the combination which comprises a substantially closed tank, a pair of spaced headers positioned in the bottom of the tank, said headers adapted to be used for, selectively, supplying water to the tank and withdrawing sludge from the tank, spaced perforated tubular fingers extended laterally from each of said headers, a pair of inverted U-shaped units positioned on the outside of the tank, each of said units including an inner leg and an outer leg and the upper ends of the legs of each unit being connected with an arcuate section having a vent therein, the lower ends of the inner legs of each of the units being connected to one of said headers, the lower ends of each of the outer legs of the units being connected to a source of water supply, valves in each of the connections from the outer legs to the source of water supply, a blow-off connection having a valve therein extended from each of said headers, a suction pipe for withdrawing fluid from the tank extended through the wall of the tank, an intake tube having an inverted U-shaped upper end in the tank and positioned whereby an opening in the end of the tube extends downwardly, means pivotally mounting said intake tube on the end of the suction pipe extended into the tank, and a float mounted on the upper part of said intake tube and positioned whereby the end of the tube follows the surface of the water to maintain the opening in the end of the tube just below the surface of the water.

References Cited in the file of this patent

UNITED STATES PATENTS

| | | |
|---|---|---|
| 365,259 | Ide | June 21, 1887 |
| 530,684 | Gibbons | Dec. 11, 1894 |
| 651,833 | Deutsch | June 19, 1900 |
| 758,367 | Joseph | Apr. 26, 1904 |
| 1,140,118 | Collins | May 18, 1915 |
| 1,430,425 | Widme | Sept. 26, 1922 |
| 1,652,036 | McKesson | Dec. 6, 1927 |
| 1,978,015 | Erdman | Oct. 23, 1934 |
| 2,010,363 | Hine | Aug. 6, 1935 |
| 2,296,713 | Hinsch | Sept. 22, 1942 |
| 2,530,594 | Benedict | Nov. 21, 1950 |